US010103439B2

(12) United States Patent
Hensarling et al.

(10) Patent No.: US 10,103,439 B2
(45) Date of Patent: Oct. 16, 2018

(54) TILTED ANTENNA BOBBINS AND METHODS OF MANUFACTURE

(71) Applicant: Halliburton Energy Services, Inc., Houston, TX (US)

(72) Inventors: Jesse K. Hensarling, Cleveland, TX (US); Paul F. Rodney, Spring, TX (US); James H. Cobb, Cypress, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 0 days.

(21) Appl. No.: 15/808,828

(22) Filed: Nov. 9, 2017

(65) Prior Publication Data

US 2018/0069313 A1 Mar. 8, 2018

Related U.S. Application Data

(62) Division of application No. 15/038,513, filed as application No. PCT/US2015/042186 on Jul. 27, 2015, now Pat. No. 9,923,275.

(51) Int. Cl.

| | |
|---|---|
| ***G01V 3/28*** | (2006.01) |
| ***H01Q 7/08*** | (2006.01) |
| ***H01Q 1/44*** | (2006.01) |

(52) U.S. Cl.

CPC ................. *H01Q 7/08* (2013.01); *H01Q 1/44* (2013.01)

(58) Field of Classification Search

CPC . G01V 3/18; G01V 3/28; G01V 13/00; H01Q 7/00; H01Q 7/08

USPC .................................. 324/333–343; 343/719

See application file for complete search history.

(56) References Cited

U.S. PATENT DOCUMENTS

| | | | |
|---|---|---|---|
| 3,761,752 A | 9/1973 | Anderson | |
| 4,362,187 A | 12/1982 | Harris et al. | |
| 4,500,860 A | 2/1985 | Vermilyea | |
| 5,025,997 A | 6/1991 | Shi et al. | |
| 6,788,271 B1 | 9/2004 | Koo et al. | |
| 6,794,875 B2 * | 9/2004 | Strickland ................ | G01V 3/28 324/335 |
| 6,921,042 B1 | 7/2005 | Goodzeit et al. | |
| 7,525,315 B2 | 4/2009 | Fredette et al. | |
| 7,889,042 B2 | 2/2011 | Meinke | |
| 7,915,990 B2 | 3/2011 | Stelzer et al. | |

(Continued)

FOREIGN PATENT DOCUMENTS

| | | |
|---|---|---|
| EP | 0056606 A1 | 7/1982 |
| JP | 2004-363763 A | 12/2004 |

OTHER PUBLICATIONS

International Search Report and Written Opinion from PCT/US2015/042186, dated Apr. 26, 2016.

*Primary Examiner* — Dameon E Levi
*Assistant Examiner* — Hasan Islam
(74) *Attorney, Agent, or Firm* — McDermott Will & Emery LLP

(57) ABSTRACT

An antenna assembly includes a bobbin that provides a cylindrical body that defines an outer radial surface, an inner radial surface, and a central axis. One or more channels are defined on the outer radial surface, and each channel provides a first sidewall, a second sidewall opposite the first sidewall, a floor, and a pocket jointly defined by the first sidewall and the floor. A coil including one or more wires is wrapped about the bobbin and received within the one or more channels.

20 Claims, 4 Drawing Sheets

(56) References Cited

U.S. PATENT DOCUMENTS

| | | | |
|---|---|---|---|
| 7,990,247 B2 | 8/2011 | Meinke | |
| 8,001,672 B2 | 8/2011 | Meinke | |
| 8,471,562 B2 | 6/2013 | Knizhnik | |
| 8,704,421 B2 | 4/2014 | Schein et al. | |
| 2005/0189945 A1 | 9/2005 | Reiderman | |
| 2006/0043973 A1 | 3/2006 | Chen et al. | |
| 2008/0030415 A1* | 2/2008 | Homan .................... | H01Q 1/04<br>343/719 |
| 2013/0249561 A1 | 9/2013 | Knizhnik | |
| 2017/0170565 A1 | 6/2017 | Hensarling et al. | |

* cited by examiner

TILTED ANTENNA BOBBINS AND METHODS OF MANUFACTURE

CROSS-REFERENCE TO RELATED APPLICATIONS

This application is a divisional application of U.S. application Ser. No. 15/038,513, entitled "Tilted Antenna Bobbins and Methods of Manufacture", filed May 23, 2016, which is a national stage application of PCT/US2015/042186 entitled "Tilted Antenna Bobbins and Methods of Manufacture," filed Jul. 27, 2015, each of which is hereby incorporated by reference in its entirety for all purposes.

BACKGROUND

During drilling operations for the extraction of hydrocarbons, a variety of recording and transmission techniques are used to provide or record real-time data from the vicinity of a drill bit. Measurements of surrounding subterranean formations may be made throughout drilling operations using downhole measurement and logging tools, such as measurement-while-drilling (MWD) and/or logging-while-drilling (LWD) tools, which help characterize the formations and aid in making operational decisions. More particularly, such wellbore logging tools make measurements used to determine the electrical resistivity (or its inverse, conductivity) of the surrounding subterranean formations being penetrated, where the electrical resistivity indicates various geological features of the formations. Resistivity measurements may be taken using one or more antennas coupled to or otherwise associated with the wellbore logging tools.

Logging tool antennas are often formed by positioning coil windings about an axial section of the wellbore logging tool, such as a drill collar. A ferrite material or "ferrites" are sometimes positioned beneath the coil windings to increase the efficiency and/or sensitivity of the antenna. The ferrites facilitate a higher magnetic permeability path (i.e., a flux conduit) for the magnetic field generated by the coil windings, and help shield the coil windings from the drill collar and associated losses (e.g., eddy currents generated on the drill collar).

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates generally to wellbore logging tools used in the oil and gas industry and, more particularly, to tilted antenna bobbins used in wellbore logging tools and methods of wrapping coil windings about the tilted antenna bobbins.

The embodiments described herein make the fabrication of tilted antennas easier. More specifically, tilted antenna assemblies are described that include a bobbin that provides a cylindrical body that defines an outer radial surface, an inner radial surface, and a central axis. One or more channels are defined on the outer radial surface, and each channel provides a first sidewall, a second sidewall opposite the first sidewall, a floor, and an annular pocket jointly defined by the first sidewall and the floor. A coil including one or more wires is wrapped about the bobbin and received within the one or more channels. The one or more channels may extend about a circumference of the bobbin at a winding angle that ranges between perpendicular and parallel to the central axis. Moreover, the floor may extend at an angle ranging between 20° and 70° with respect to the central axis, thereby providing a surface to support the tension applied to the one or more wires forming the coil. With the angled floor, the tension applied to the wires may bear against the angled floor, thereby making the tilted antenna assemblies easier to automate and with less labor than conventional designs.

Figure 1:
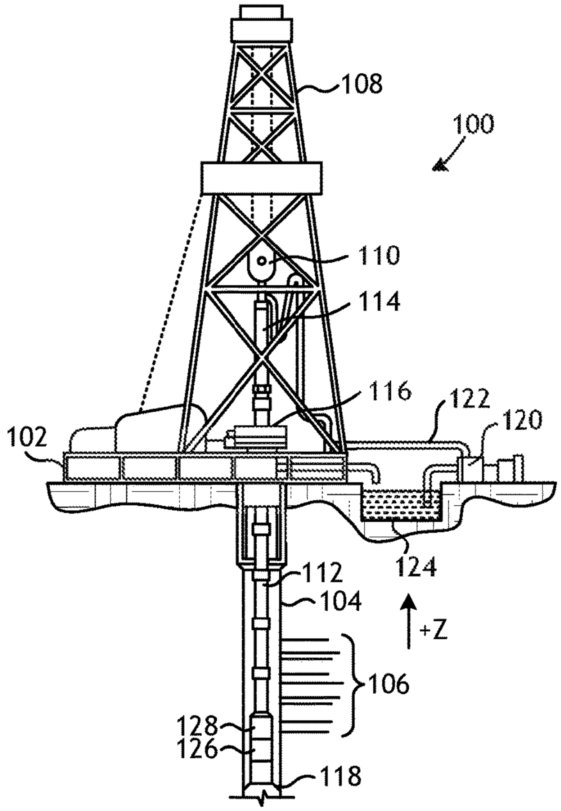
FIG. 1 is a schematic diagram of an exemplary drilling system that may employ the principles of the present disclosure.

FIG. 1 is a schematic diagram of an exemplary drilling system 100 that may employ the principles of the present disclosure, according to one or more embodiments. As illustrated, the drilling system 100 may include a drilling platform 102 positioned at the surface and a wellbore 104 that extends from the drilling platform 102 into one or more subterranean formations 106. In other embodiments, such as in an offshore drilling operation, a volume of water may separate the drilling platform 102 and the wellbore 104.

The drilling system 100 may include a derrick 108 supported by the drilling platform 102 and having a traveling block 110 for raising and lowering a drill string 112. A kelly 114 may support the drill string 112 as it is lowered through a rotary table 116. A drill bit 118 may be coupled to the drill string 112 and driven by a downhole motor and/or by rotation of the drill string 112 by the rotary table 116. As the drill bit 118 rotates, it creates the wellbore 104, which penetrates the subterranean formations 106. A pump 120 may circulate drilling fluid through a feed pipe 122 and the kelly 114, downhole through the interior of drill string 112, through orifices in the drill bit 118, back to the surface via the annulus defined around drill string 112, and into a retention pit 124. The drilling fluid cools the drill bit 118 during operation and transports cuttings from the wellbore 104 into the retention pit 124.

The drilling system 100 may further include a bottom hole assembly (BHA) coupled to the drill string 112 near the drill bit 118. The BHA may comprise various downhole measurement tools such as, but not limited to, measurement-while-drilling (MWD) and logging-while-drilling (LWD) tools, which may be configured to take downhole measurements of drilling conditions. The MWD and LWD tools may include at least one wellbore logging tool 126, which may comprise one or more antennas axially spaced along the length of the wellbore logging tool 126 and capable of receiving and/or transmitting electromagnetic (EM) signals. The wellbore logging tool 126 may further comprise a plurality of ferrites used to shield the EM signals and thereby increase azimuthal sensitivity of the wellbore logging tool 126.

As the drill bit 118 extends the wellbore 104 through the formations 106, the wellbore logging tool 126 may continuously or intermittently collect azimuthally-sensitive measurements relating to the resistivity of the formations 106, i.e., how strongly the formations 106 opposes a flow of electric current. The wellbore logging tool 126 and other sensors of the MWD and LWD tools may be communicably coupled to a telemetry module 128 used to transfer measurements and signals from the BHA to a surface receiver (not shown) and/or to receive commands from the surface receiver. The telemetry module 128 may encompass any known means of downhole communication including, but not limited to, a mud pulse telemetry system, an acoustic telemetry system, a wired communications system, a wireless communications system, or any combination thereof. In certain embodiments, some or all of the measurements taken at the wellbore logging tool 126 may also be stored within the wellbore logging tool 126 or the telemetry module 128 for later retrieval at the surface upon retracting the drill string 112.

Figure 2:
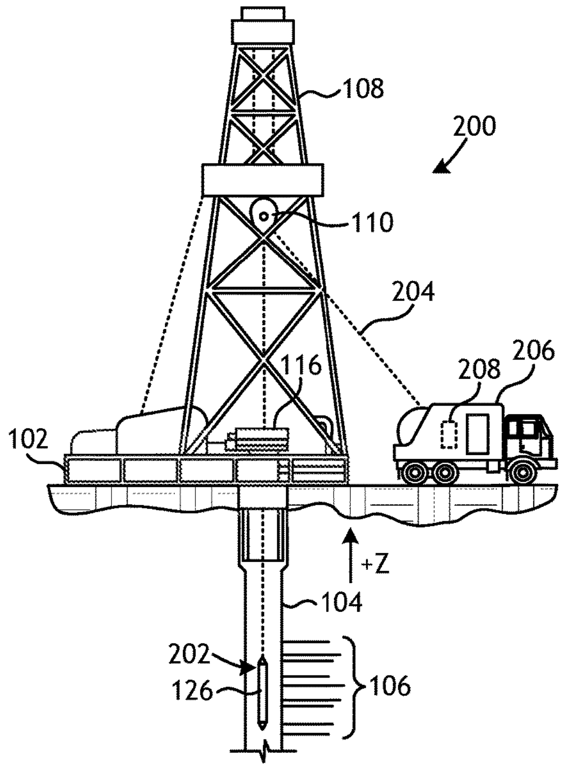
FIG. 2 is a schematic diagram of an exemplary wireline system that may employ the principles of the present disclosure.

At various times during the drilling process, the drill string 112 may be removed from the wellbore 104, as shown in FIG. 2, to conduct measurement/logging operations. More particularly, FIG. 2 depicts a schematic diagram of an exemplary wireline system 200 that may employ the principles of the present disclosure, according to one or more embodiments. Like numerals used in FIGS. 1 and 2 refer to the same components or elements and, therefore, may not be described again. As illustrated, the wireline system 200 may include a wireline instrument sonde 202 that may be suspended into the wellbore 104 by a cable 204. The wireline instrument sonde 202 may include the wellbore logging tool 126 described above, which may be communicably coupled to the cable 204. The cable 204 includes conductors for transporting power to the wireline instrument sonde 202 and also facilitates communication between the surface and the wireline instrument sonde 202. A logging facility 206, shown in FIG. 2 as a truck, may collect measurements from the wellbore logging tool 126, and may include computing and data acquisition systems 208 for controlling, processing, storing, and/or visualizing the measurements gathered by the wellbore logging tool 126. The computing facilities 208 may be communicably coupled to the wellbore logging tool 126 by way of the cable 204.

Figure 3A:
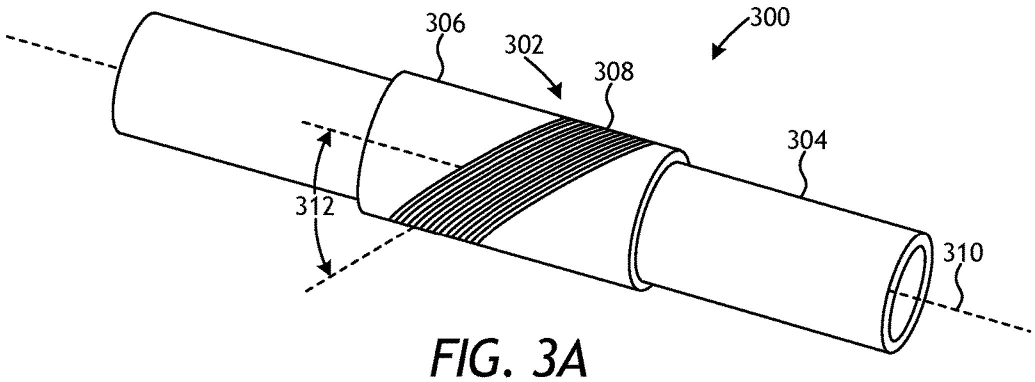
FIGS. 3A and 3B are views of an exemplary antenna assembly.

FIG. 3A is a partial isometric view of an exemplary wellbore logging tool 300, according to one or more embodiments. The logging tool 300 may be the same as or similar to the wellbore logging tool 126 of FIGS. 1 and 2 and, therefore, may be used in the drilling or wireline systems 100, 200 depicted therein. The wellbore logging tool 300 is depicted as including an antenna assembly 302 that can be positioned about a tool mandrel 304, such as a drill collar or the like. The antenna assembly 302 includes a bobbin 306 and a coil 308 wrapped about the bobbin 306 and extending axially by virtue of winding along at least a portion of the outer surface of the bobbin 306.

The bobbin 306 may structurally comprise a high temperature plastic, a thermoplastic, a polymer (e.g., polyimide), a ceramic, or an epoxy material, but could alternatively be made of a variety of other non-magnetic, electrically insulating/non-conductive materials. The bobbin 306 can be fabricated, for example, by additive manufacturing (i.e., 3D printing), molding, injection molding, machining, or other known manufacturing processes.

The coil 308 can include any number of consecutive "turns" (i.e. windings of wire) about the bobbin 306, but typically will include at least a plurality (i.e. two or more) consecutive full turns, with each full turn extending 360° about the bobbin 306. In some embodiments, a pathway or guide for receiving the coil 308 may be formed along the outer surface of the bobbin 306. For example, and as will be described in more detail below, one or more channels may be defined in the outer surface of the bobbin 306 to receive and seat the windings of the coil 308.

The coil 308 can be concentric or eccentric relative to a central axis 310 of the tool mandrel 304. As illustrated, the turns or windings of the coil 308 extend about the bobbin 306 at a winding angle 312 offset from the central axis 310. As a result, the antenna assembly 302 may be characterized and otherwise referred to as a "tilted coil" or "directional" antenna, and the bobbin 306 may be referred to as a tilted antenna bobbin. In the illustrated embodiment, the winding angle 312 is 45°, by way of example, but could alternatively be any angle offset from the central axis 310 (i.e., horizontal), without departing from the scope of the disclosure.

Figure 3B:
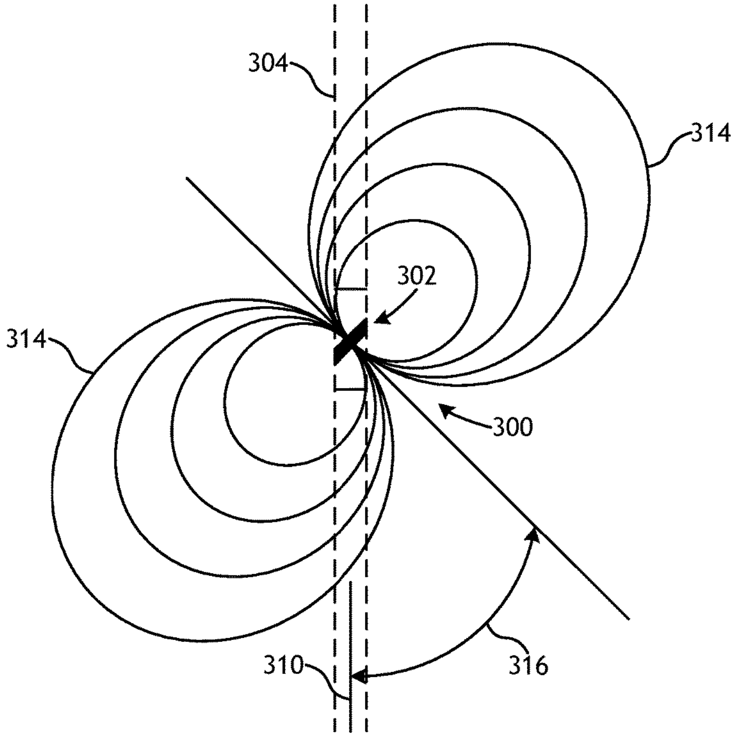

FIG. 3B is a schematic side view of the wellbore logging tool 300 of FIG. 3A. When current is passed through the coil 308 (FIG. 3A) of the antenna assembly 302, a dipole magnetic field 314 may be generated that extends radially outward from the antenna assembly 302 and orthogonal to the winding direction of the coil 308. As a result, the antenna assembly 302 may exhibit a magnetic field angle 316 with respect to the tool mandrel 304 and, since the winding angle 312 (FIG. 3A) is 45°, the resulting magnetic field angle 316 will also be 45° offset from the central axis 310. As will be appreciated, however, the magnetic field angle 316 may be varied by adjusting or manipulating the winding angle 312.

Figure 4A:
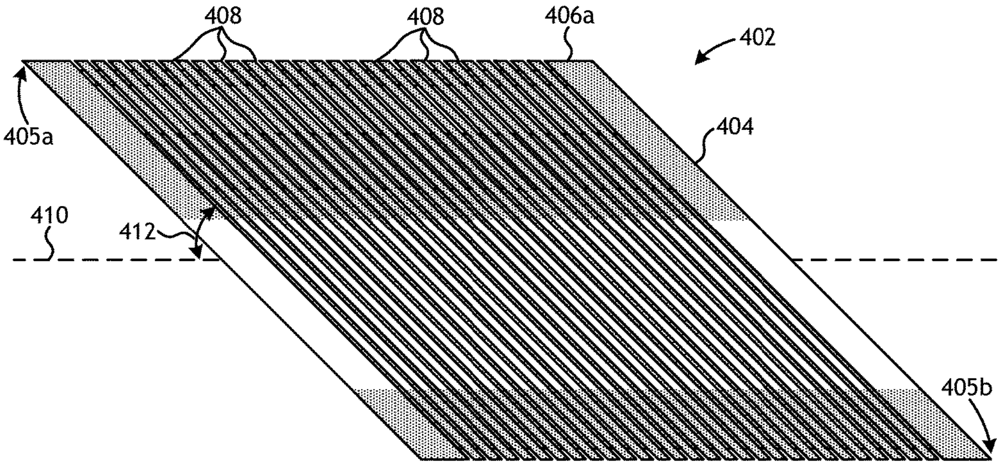
FIG. 4A is an enlarged isometric view of an exemplary bobbin.
Figure 4B:
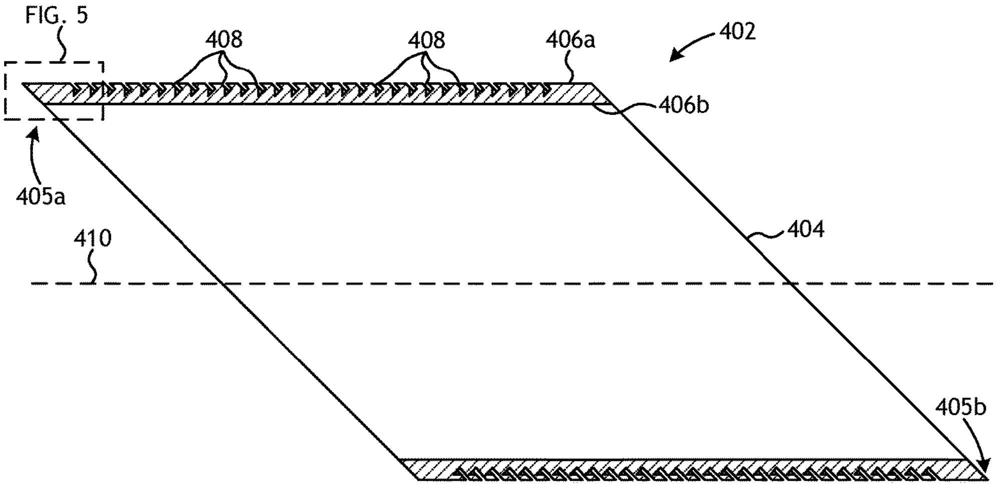
FIG. 4B is a cross-sectional view of the bobbin of FIG. 4A.

FIG. 4A is an enlarged isometric view of an exemplary bobbin 402, according to one or more embodiments, and FIG. 4B is a cross-sectional view of the bobbin 402. The bobbin 402 may be the same as or similar to the bobbin 306 of FIGS. 3A-3B and, therefore, may be used in the antenna assembly 302 as part of the logging tool 300. Similar to the bobbin 306, for example, the bobbin 402 may structurally comprise a high temperature plastic, a thermoplastic, a polymer (e.g., polyimide), a ceramic, or an epoxy material, but could alternatively be made of a variety of other non-magnetic, electrically insulating/non-conductive materials. Moreover, the bobbin 402 may be fabricated, for example, by additive manufacturing (i.e., 3D printing), molding, injection molding, machining, or other known manufacturing processes.

The bobbin 402 may comprise a generally cylindrical body 404 that provides a first axial end 405*a*, a second axial end 405*b*, an outer radial surface 406*a*, and an inner radial surface 406*b*. In the illustrated embodiment, the first and second axial ends 405*a,b* of the bobbin 402 are depicted as being angled with respect to the central axis 410 and otherwise defined at an angle offset from perpendicular to the central axis 410. It will be appreciated, however, that embodiments are contemplated herein where one or both of the first and second ends 405*a,b* are orthogonal to a central axis 410 of the bobbin 402, such as is depicted in the bobbin 306 of FIGS. 3A and 3B. In some embodiments, the body 404 may comprise two or more arcuate sections or parts that may be cooperatively assembled or coupled to form the bobbin 402. In other embodiments, however, the body 404 may comprise a monolithic, sleeve-like structure.

As illustrated, one or more channels 408 may be defined on the outer radial surface 406*a* of the body 404 and may extend radially a short distance into the body 404 and toward the inner radial surface 406*b*. In some embodiments, the channels 408 may form a plurality of independent annular grooves defined in the outer radial surface 406*a* and axially offset from each other between the first and second ends 405*a,b*. In other embodiments, however, the channels 408 may comprise a single helical annular groove that continuously winds about the circumference of the bobbin 402 between the first and second ends 405*a,b*.

Each channel 408 may be configured to receive and seat one or more wires to form a coil, such as the coil 308 of FIG. 3A. The wires may be wound about the outer radial surface 406*a* of the bobbin 402 within the channels 408 to desired specifications. For example, the size of the wire(s) and the number of turns of the wire(s) in each channel 408 to form the coil may be dependent on the power requirements and desired frequency of the associated antenna assembly (e.g., the antenna assembly 302 of FIGS. 3A-3B). The resulting coil can be concentric or eccentric relative to the central axis 410 of the bobbin 402.

As shown in FIG. 4A, the channels 408 may be defined in the outer radial surface of the body 406*a* and extend about the circumference of the bobbin 402 at a winding angle 412 with respect to the central axis 410. The winding angle 412 may be any angle ranging between perpendicular and parallel to the central axis 410 and, as a result, the bobbin 402 may be referred to as a tilted antenna bobbin. By way of example, as illustrated, the winding angle 412 may be 450 offset from the central axis 410 with reference to the first end 405*a* and, therefore, 135° offset from the central axis 410 with reference to the second end 405*b*. In other embodiments, however, the winding angle 412 may alternatively be 45° offset from the central axis 410 with reference to the second end 405*b* and, therefore, 135° offset from the central axis 410 with reference to the first end 405*a*, without departing from the scope of the disclosure.

Figure 5:
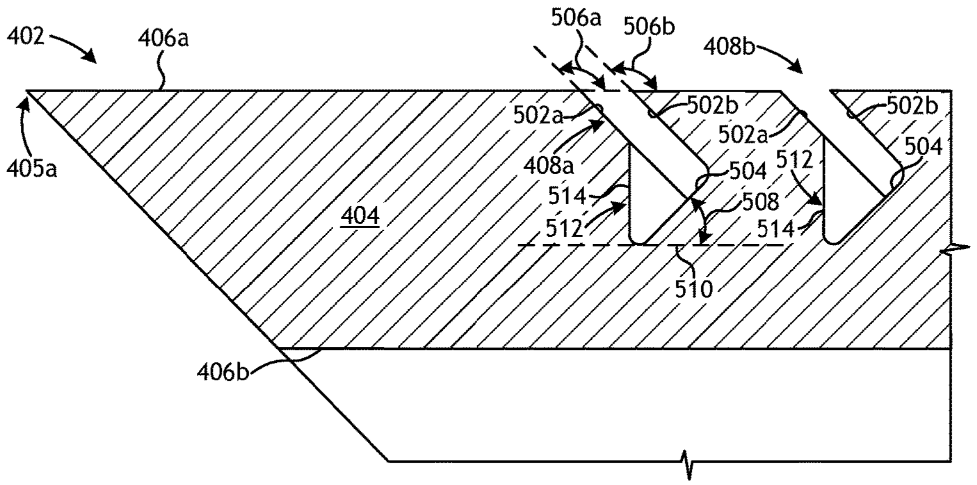
FIG. 5 is an enlarged cross-sectional view of bobbin of FIGS. 4A-4B as indicated by the dashed box in FIG. 4B.

FIG. 5 is an enlarged cross-sectional view of the region of the bobbin 402 indicated by the dashed box shown in FIG. 4B. More particularly, FIG. 5 depicts two channels 408, shown as a first channel 408*a* and a second channel 408*b*, defined in the outer radial surface 406*a* of the body 404 and axially offset from each other. As illustrated, each channel 408*a,b* may provide and otherwise define a first sidewall 502*a*, an opposing second sidewall 502*b*, and a floor 504 that forms at least a portion of the bottom of the corresponding channel 408*a,b*.

The first and second sidewalls 502*a,b* may extend at a first angle 506 (shown as first angles 506*a* and 506*b*) with respect to the outer radial surface 406*a* of the bobbin 402, where the outer radial surface 406*a* is parallel to the central axis 410 (FIGS. 4A-4B) of the bobbin 402. In some embodiments, the first angles 502*a,b* may be the same and, therefore, the first and second sidewalls 502*a,b* may extend substantially parallel to one another away from the outer radial surface 406*a* and into the body 404. The first angles 506*a,b* may be the same as and otherwise parallel to the winding angle 412 (FIG. 4A) for the channels 408*a,b*. Accordingly, in at least one embodiment, the first angles 506*a,b* may be 135° offset from the outer radial surface 406*a* (or the central axis 410) with respect to second end 405*b* (FIGS. 4A-4B) and, therefore, 45° offset from the outer radial surface 406*a* (or the central axis 410) with reference to the first end 405*a* of the bobbin 402. In other embodiments, however, the first angles 506*a,b* may alternatively be any angle offset from the outer radial surface 406*a* (or the central axis 410), without departing from the scope of the disclosure.

In other embodiments, the first angle 506*a* for the first sidewall 502*a* may be different from the first angle 506*b* for the second sidewall 502*b*. In such embodiments, the first and second sidewalls 502*a,b* may progressively taper toward the floor 504 or toward the outer radial surface 406*a*. Alternatively, in such embodiments, one of the first angles 506*a,b* may be about 135° offset from the outer radial surface 406*a* (or the central axis 410), while the other of the first angles 506*a,b* may be any other angle offset from the outer radial surface 406*a* (or the central axis 410).

The floor 504 may form at least a portion of the bottom of each channel 408*a,b*. In some embodiments, as illustrated, the floor 504 may comprise a substantially planar surface. In other embodiments, however, the floor 504 may comprise a variable or undulating surface, without departing from the scope of the disclosure. The floor 504 may extend at a second angle 508 with respect to horizontal 510, where the horizontal 510 direction is parallel to the outer radial surface 406*a* and the central axis 410 (FIGS. 4A-4B) of the bobbin 402. In other words, the floor 504 may extend at the second angle 508 with respect to the outer radial surface 406*a* (or the central axis 410). In some embodiments, the floor 504 may be substantially orthogonal to both the first and second sidewalls 502*a,b*. In such embodiments, the second angle 508 may be 45° offset from the outer radial surface 406 (or the central axis 410). In other embodiments, however, the second angle 508 may range between about 20° and about 70° offset from the outer radial surface 406 (or the central axis 410), without departing from the scope of the disclosure.

Each channel 408*a,b* may further provide and otherwise define an annular pocket 512. More particularly, the annular pocket 512 may be jointly defined by the first sidewall 502*a* and the floor 504. The annular pocket 512 may include an angled leg 514 that extends at an angle from the first sidewall 502*a* and provides a transition between the first sidewall 502*a* and the floor 504. As a result, each channel 408*a,b* may exhibit a generally boot-like cross-sectional shape where the annular pocket 512 defines the boot portion of the channels 408*a,b*. In some embodiments, the angled leg 514 may extend from the first sidewall 502*a* at an angle substantially orthogonal to horizontal 510 and, therefore, substantially orthogonal to the outer radial surface 406 (or the central axis 410). Accordingly, in such embodiments, the angled leg 514 and the floor 504 may meet at a 450 angle. In other embodiments, however, the angled leg 514 may extend from the first sidewall 502*a* at any other angle offset from orthogonal to horizontal 510, without departing from the scope of the disclosure, and thereby meet the floor 504 at a variety of angles offset from 45°. If the angle 508 is greater than 45° to horizontal 510, the wire of the coil 318 (FIGS. 3A and 6) will fill the annular pocket 512 more fully starting first at the toe of the boot portion with less likelihood of the formation of gaps between adjacent wires.

Figure 6:
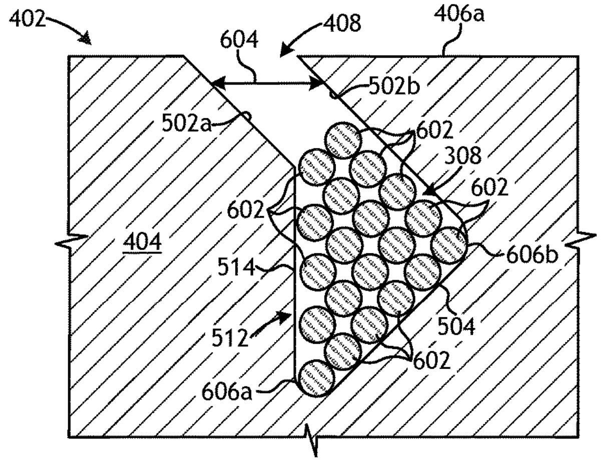
FIG. 6 is an enlarged cross-sectional view of an exemplary channel defined in the bobbin of FIGS. 4A-4B.

FIG. 6 is an enlarged cross-sectional side view of an exemplary channel 408, according to one or more embodiments. Similar reference numerals used in prior figures will correspond to similar components or elements that may not be described again. A plurality of wire ends are shown in FIG. 6 and correspond to one or more wires 602 received within the channel 408 and the annular pocket 512. In some embodiments, as mentioned above, the wires 602 may comprise a single wire 602 wrapped about the bobbin 402 and received within the channel 408 to form the coil 308. Accordingly, in such embodiments, each wire end shown in FIG. 6 may comprise a single turn of the wire 602, with each full turn extending 360° about the bobbin 402 within the channel 408. In other embodiments, however, the one or more wires 602 may comprise a plurality of wires or a multi-strand wire received within the channel 408 to form the coil 308, without departing from the scope of the disclosure.

The size or gauge of the wire 602 may vary depending on the power requirements and the desired frequency of the associated antenna assembly (e.g., the antenna assembly 302 of FIGS. 3A-3B). For instance, the gauge of the wire 602 may range between about 30 gauge and about 14 gauge, but could equally be above 30 gauge or below 14 gauge depending on the design and configuration of the channel(s) 408. As will be appreciated, a lower gauge wire 602 (i.e., a larger wire 602) may result in less turns of the wire 602 being able to be accommodated within the channel 408 to form the coil 308. In at least one embodiment, the size or gauge of the wire 602 may be slightly smaller than a width 604 between the first and second sidewalls 502*a,b*. In some embodiments, the bottom of the channel 408, including the annular pocket 512, may be sized and otherwise designed to accommodate two or more turns of the wire 602 side-by-side with a depth (i.e., wires 602 stacked atop one another) corresponding to the number of layers (turns) needed for the coil 308 design.

The channel 408 may provide and otherwise define a first transition surface 606*a* between the angled leg 514 and the floor 504, and a second transition surface 606*b* between the second sidewall 502*a* and the floor 504. In some embodiments, one or both of the transition surfaces 606*a,b* may form a hard angle, such as a 90° angled corner. In other embodiments, however, one or both of the first and second transition surfaces 606*a,b* may be curved and otherwise provide a radius, as illustrated. As will be appreciated, curved transition surfaces 606*a,b* may strengthen the bottom of the channel 408 against tension applied to the wire 602 during assembly of the coil 308. In at least one embodiment, the radius of curvature of one or both of the transition surfaces 606*a,b* may be substantially similar to the radius of curvature of the wire 602. In such embodiments, the wire 602 may be able to be seated in close engagement with the transition surfaces 606*a,b*.

Referring again to FIG. 5, with continued reference to FIG. 6, building the coil 308 about the outer surface 406*a* of the bobbin 402 within the channels 408 requires the wire 602 to be placed under a large amount of tension as it is wrapped about the circumference of the bobbin 402 at the winding angle 412 (FIG. 4A). Conventional tilted antenna bobbins will typically provide a floor 504 that is substantially parallel to horizontal 510 and, therefore, substantially parallel to the outer radial surface 406 (or the central axis 410 of the bobbin). In such tilted antenna bobbins, the tension assumed by the wire 602 urges the wire 602 toward an axial end of the floor 504; either the 0° end or the 180° end, depending on which direction winding of the wire 602 is proceeding. In such cases, an adhesive is often required to hold the windings of the wire 602 in place on the floor 504 to ensure that the coil 308 is built uniformly. As can be appreciated, this can be a time-consuming process.

According to the presently described embodiments, however, the floor 504 of the channels 408 may be angularly offset from horizontal 510 by the second angle 508, which can be 45° in some embodiments. As a result, as the coil 308 is wrapped about the outer surface 406*a* of the bobbin 402, the tension on the wire 602 may be assumed at least partially by the floor 504. In at least one embodiment, the second angle 508 may be configured such that the tension on the wire 602 is assumed in a direction that is generally orthogonal to the floor 504, whereby the floor 504 assumes substantially all the tension applied on the wire 602. With the tension in the wire 602 being assumed at least partially by the floor 504 while building the coil 308, the wire 602 may be less inclined to slip toward the axial ends of the floor 504. As a result, the wire 602 will have less tendency to slide or bunch up, thereby allowing for the fabrication of a more uniform part. Moreover, with less tendency for the wire 602 to slide or bunch up at an axial end of the floor 504 during winding, building the coil 308 may be automated and thereby completed in less time and using less labor.

Embodiments disclosed herein include:

A. An antenna assembly that includes a bobbin providing a cylindrical body that defines an outer radial surface, an inner radial surface, and a central axis, one or more channels defined on the outer radial surface, each channel providing a first sidewall, a second sidewall opposite the first sidewall, a floor, and a pocket jointly defined by the first sidewall and the floor, and a coil including one or more wires wrapped about the bobbin and received within the one or more channels.

B. A method that includes introducing a wellbore logging tool into a wellbore, the wellbore logging tool including a tool mandrel and a bobbin secured to an outer surface of the tool mandrel. The bobbin includes a cylindrical body that defines an outer radial surface, an inner radial surface, and a central axis, one or more channels defined on the outer radial surface, each channel providing a first sidewall, a second sidewall opposite the first sidewall, a floor, and a pocket jointly defined by the first sidewall and the floor, and a coil including one or more wires wrapped about the bobbin and received within the one or more channels. The method further includes obtaining measurements of a surrounding subterranean formation with the wellbore logging tool.

Each of embodiments A and B may have one or more of the following additional elements in any combination: Element 1: wherein the one or more channels comprise a plurality of independent annular grooves defined in the outer radial surface and axially offset from each other. Element 2: wherein the one or more channels comprise a single helical annular groove that continuously winds about a circumference of the bobbin. Element 3: wherein the one or more channels extend about a circumference of the bobbin at a winding angle with respect to the central axis, and wherein the winding angle ranges between perpendicular and parallel to the central axis. Element 4: wherein the winding angle is 45° offset from the central axis. Element 5: wherein the first and second sidewalls each extend into the cylindrical body at an angle offset from perpendicular to the outer radial surface. Element 6: wherein the angle of the first sidewall is different from the angle of the second sidewall. Element 7: wherein the floor extends at an angle ranging between 20° and 70° with respect to the central axis. Element 8: wherein the angle is 45° offset from the central axis. Element 9: wherein the angle is perpendicular to an angle at which the first and second sidewalls extend into the cylindrical body. Element 10: wherein the annular pocket includes an angled leg that extends at an angle from the first sidewall and provides a transition between the first sidewall and the floor. Element 11: wherein the angle is orthogonal to the outer radial surface. Element 12: wherein each channel further provides a first transition surface between the angled leg and the floor, and a second transition surface between the second sidewall and the floor, and wherein at least one of the first and second transition surfaces is curved.

Element 13: wherein the tool mandrel is operatively coupled to a drill string and introducing the wellbore logging tool into the wellbore further comprises extending the wellbore logging tool into the wellbore on the drill string, and drilling a portion of the wellbore with a drill bit secured to a distal end of the drill string. Element 14: wherein introducing the wellbore logging tool into the wellbore further comprises extending the wellbore logging tool into the wellbore on wireline as part of a wireline instrument sonde. Element 15: wherein the floor extends at an angle ranging between 20° and 70° with respect to the central axis. Element 16: wherein the angle is perpendicular to an angle at which the first and second sidewalls extend into the cylindrical body. Element 17: wherein the annular pocket includes an angled leg that extends at an angle from the first sidewall to the floor. Element 18: wherein each channel further provides a first transition surface between the angled leg and the floor, and a second transition surface between the second sidewall and the floor, and wherein at least one of the first and second transition surfaces is curved, the method further comprising strengthening a bottom of each channel against tension applied to the one or more wires at the at least one of the first and second transition surfaces that is curved.

By way of non-limiting example, exemplary combinations applicable to A and B include: Element 3 with Element 4; Element 5 with Element 6; Element 7 with Element 8; Element 7 with Element 9; Element 10 with Element 11; Element 10 with Element 12; Element 15 with Element 16; and Element 17 with Element 18.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:

introducing a wellbore logging tool into a wellbore, the wellbore logging tool including a tool mandrel and a bobbin secured to an outer surface of the tool mandrel, wherein the bobbin includes:

a cylindrical body defining an outer radial surface, an inner radial surface, and a central axis;

one or more channels defined by the outer radial surface, each channel including a first sidewall, a second sidewall opposite the first sidewall, a floor, and an annular pocket jointly defined by the first sidewall and the floor, the first sidewall extending from the outer radial surface to an intermediate location in the cylindrical body at a first angle and extending from the intermediate location to the floor at a second angle, the first angle being non-orthogonal to the outer radial surface and the second angle being orthogonal to the outer radial surface, wherein the annular pocket includes an angled leg that represents a portion of the first sidewall from the intermediate location in the cylindrical body to the floor, wherein each channel further provides a first transition surface between the angled leg and the floor and a second transition surface between the second sidewall and the floor, wherein at least one of the first and second transition surfaces is curved; and a coil including one or more wires wrapped about the bobbin and received within the one or more channels; and obtaining measurements of a surrounding subterranean formation with the wellbore logging tool.

2. The method of claim 1, wherein the tool mandrel is operatively coupled to a drill string and introducing the wellbore logging tool into the wellbore further comprises:

extending the wellbore logging tool into the wellbore on the drill string; and drilling a portion of the wellbore with a drill bit secured to a distal end of the drill string.

3. The method of claim 1, wherein introducing the wellbore logging tool into the wellbore further comprises extending the wellbore logging tool into the wellbore on a wireline as part of a wireline instrument sonde.

4. The method of claim 1, wherein the floor extends at an angle ranging between 20° and 70° with respect to the central axis.

5. The method of claim 4, wherein the angle is perpendicular to an angle at which the first and second sidewalls extend into the cylindrical body.

6. The method of claim 1, wherein a tension on at least one of the one or more wires is assumed at least partially by the floor.

7. The method of claim 1, wherein the bobbin structurally comprises a high temperature plastic, a thermoplastic, a polymer, a ceramic, or an epoxy material.

8. The method of claim 1, wherein the bobbin structurally comprises a non-magnetic, electrically insulating/non-conductive material.

9. The method of claim 1, wherein the coil includes two or more consecutive full turns, with each full turn extending 360° about the bobbin.

10. The method of claim 1, wherein the obtaining comprises passing an electric current through the one or more wires while the wellbore logging tool is disposed in the wellbore.

11. A method, comprising:

obtaining azimuthally-sensitive resistivity measurements relating to a subterranean formation using a wellbore logging tool, the wellbore logging tool including a bobbin secured to a tool mandrel, wherein the bobbin includes:

a cylindrical body defining an outer radial surface, an inner radial surface, and a central axis;

a channel defined by the outer radial surface, the channel including a first sidewall, a second sidewall opposite the first sidewall, a floor, and an annular pocket jointly defined by the first sidewall and the floor, the first sidewall extending from the outer radial surface to an intermediate location in the cylindrical body at a first angle and extending from the intermediate location to the floor at a second angle, the first angle being non-orthogonal to the outer radial surface and the second angle being orthogonal to the outer radial surface, wherein the annular pocket includes an angled leg that represents a portion of the first sidewall from the intermediate location in the cylindrical body to the floor, wherein each channel further provides a first transition surface between the angled leg and the floor and a second transition surface between the second sidewall and the floor, wherein at least one of the first and second transition surfaces is curved; and a wire extending about the bobbin within the channel.

12. The method of claim 11, wherein a tension on the wire is assumed at least partially by the floor.

13. The method of claim 11, wherein the floor extends at an angle ranging between 20° and 70° with respect to the central axis.

14. The method of claim 13, wherein the angle is perpendicular to an angle at which the first and second sidewalls extend into the cylindrical body.

15. The method of claim 11, wherein the bobbin structurally comprises a high temperature plastic, a thermoplastic, a polymer, a ceramic, or an epoxy material.

16. The method of claim 11, wherein the bobbin structurally comprises a non-magnetic, electrically insulating/non-conductive material.

17. The method of claim 11, wherein the wire forms a coil that includes two or more consecutive full turns, with each full turn extending 360° about the bobbin.

18. The method of claim 11, further comprising providing the wellbore logging tool into a wellbore, wherein the subterranean formation surrounds the wellbore.

19. The method of claim 18, wherein the obtaining comprises passing an electric current through the wire while the wellbore logging tool is disposed in the wellbore.

20. The method of claim 19, wherein providing the wellbore logging tool into the wellbore comprises extending the wellbore logging tool into the wellbore on a wireline as part of a wireline instrument sonde.

* * * * *